United States Patent
Mallevais et al.

(10) Patent No.: US 7,401,869 B2
(45) Date of Patent: Jul. 22, 2008

(54) ARCHITECTURE FOR AN AIRPLANE BRAKING SYSTEM INCLUDING TWO COMPUTERS AND CAPABLE OF WITHSTANDING TWO BREAKDOWNS, AND A METHOD OF MANAGING SUCH AN ARCHITECTURE

(75) Inventors: Stéphane Mallevais, Massy-Verrieres (FR); Jean-Pierre Garcia, Colomiers (FR)

(73) Assignee: Messier-Bugatti, Velizy Villacoublay (FR)

( * ) Notice: Subject to any disclaimer, the term of this patent is extended or adjusted under 35 U.S.C. 154(b) by 1 day.

(21) Appl. No.: 11/011,131

(22) Filed: Dec. 15, 2004

(65) Prior Publication Data
US 2005/0189814 A1   Sep. 1, 2005

(30) Foreign Application Priority Data
Dec. 22, 2003   (FR) .................................. 03 15134

(51) Int. Cl.
*B60T 8/86* (2006.01)
(52) U.S. Cl. .................... 303/126; 303/20; 303/122.04; 303/122.08
(58) Field of Classification Search .............. 303/3, 303/15, 20, 194, 122.04, 122.08, 126
See application file for complete search history.

(56) References Cited

U.S. PATENT DOCUMENTS

| | | | |
|---|---|---|---|
| 4,807,516 A * | 2/1989 | Takats ....................... 91/363 A |
| 5,274,554 A * | 12/1993 | Takats et al. ................... 701/33 |
| 5,952,799 A * | 9/1999 | Maisch et al. ................ 318/362 |
| 6,390,571 B1 * | 5/2002 | Murphy ....................... 303/126 |
| 6,513,885 B1 * | 2/2003 | Salamat et al. .......... 303/122.09 |
| 6,820,946 B2 * | 11/2004 | Salamat et al. .......... 303/122.09 |

* cited by examiner

*Primary Examiner*—Pam Rodriguez
(74) *Attorney, Agent, or Firm*—Sughrue Mion, PLLC

(57) ABSTRACT

The invention relates to an architecture for a braking system for an airplane fitted with a plurality of undercarriages each carrying a plurality of wheels, at least some of which are fitted with brakes, the architecture comprising at least two braking computers each having two modules such that in each computer, one of the modules controls a first fraction of the brakes and the other module controls a second fraction of the brakes complementary to the first. According to the invention, the architecture is configured to operate in any one of the following modes of operation:
  a first normal mode in which both modules of one of the braking computers are active for controlling all of the brakes;
  a second normal mode in which both modules of the other braking computer are active for controlling all of the brakes; and
  an alternative mode in which one module of one of the braking computers and one module of the other braking computer are active for controlling all of the brakes.

10 Claims, 2 Drawing Sheets

FIRST NORMAL MODE

SECOND NORMAL MODE

ALTERNATIVE MODE

DEGRADED MODE

ARCHITECTURE FOR AN AIRPLANE BRAKING SYSTEM INCLUDING TWO COMPUTERS AND CAPABLE OF WITHSTANDING TWO BREAKDOWNS, AND A METHOD OF MANAGING SUCH AN ARCHITECTURE

The present invention relates to an architecture for an airplane braking system including two computers and capable of withstanding two breakdowns, and it also relates to a method of managing such an architecture.

BACKGROUND OF THE INVENTION

Brake system architectures are known for airplanes fitted with a plurality of brakes, such architectures including at least two braking computers, each capable of controlling all of the brakes.

Each computer is subdivided into two channels, a first channel being adapted to control the brakes while a second channel is adapted to monitor the first channel. If divergence should appear between the channels in the active computer, then the other computer automatically takes over, thus enabling that architecture to withstand a single breakdown.

Nevertheless, if a new breakdown were to occur on the second computer, braking using all of the brakes can no longer be guaranteed using those two computers only.

It is then necessary either to accept no braking, or to make do with degraded braking, or else to provide a third computer.

OBJECT OF THE INVENTION

The invention seeks to provide a braking system architecture providing an improved level of safety, while nevertheless not requiring an additional computer.

BRIEF DESCRIPTION OF THE INVENTION

The invention provides an architecture for a braking system for an airplane fitted with a plurality of undercarriages each carrying a plurality of wheels, at least some of which are fitted with brakes, the architecture comprising at least two braking computers each having two modules such that in each computer, one of the modules controls a first fraction of the brakes and the other module controls a second fraction of the brakes complementary to the first, the architecture being configured to operate in any one of the following modes of operation:

a first normal mode in which both modules of one of the braking computers are active for controlling all of the brakes;

a second normal mode in which both modules of the other braking computer are active for controlling all of the brakes; and an alternative mode in which one module of one of the braking computers and one module of the other braking computer are active for controlling all of the brakes.

Breakdown configurations can occur in which there are two breakdowns, with one of the modules in each of the braking computers being faulty, each of the faulty modules controlling a fraction of the brakes that is complementary to the portion controlled by the other faulty module. The two remaining modules are thus theoretically capable of controlling braking while using all of the brakes of the airplane.

In the invention, braking is performed using the two modules that are sound, and thus at full capacity since it is still possible to control all of the brakes of the airplane. The architecture of the invention thus overcomes the physical grouping of the modules to enable simultaneous operation of two modules that do not belong to the same braking computer.

The braking system architecture of the invention is thus capable of withstanding at least certain combinations of two breakdowns, while nevertheless not requiring an additional computer to be used.

In a particular aspect of the invention, the modules include first monitoring means configured so that in each mode of operation the two active modules monitor each other.

Thus, regardless of whether the active modules belong to the same computer or to two different computers, they monitor each other, thereby enabling braking to be performed with all of the brakes and in great safety, regardless of the operating mode of the architecture.

Also preferably, each module comprises a first card adapted to generate a braking reference signal, and a second card adapted to generate a braking order for each brake associated with the module by modulating the braking reference signal in order to avoid skidding of said brake, the first monitoring means being associated with the first card of each module and being adapted to monitor the first card of the other active module.

Also preferably, the first card and the second card in a given module include second monitoring means configured, when said module is active, to enable the first and second cards to monitor each other.

For this purpose, the first card and the second card preferably include at least one identical input.

According to another particular aspect of the invention, the braking system architecture is configured also to operate in a degraded mode in which only one of the modules of one of the braking computers is active.

This disposition enables braking to be performed using only those brakes that are associated with the module that is active.

In a preferred configuration of the architecture of the invention, one of the modules of one of the computers is connected to a first power supply bus, one of the modules of the other computer is connected to a second power supply bus, and the other two modules that are intended to be active together in the alternative mode are connected to a third power supply bus.

In a practical aspect of the invention, each module is configured to perform at least one function other than braking and involving at least one of the undercarriages of the airplane, such as steering the airplane or lowering and/or raising the undercarriages.

The invention is also relative to a method of managing such an architecture.

BRIEF DESCRIPTION OF THE DRAWINGS

The invention will be better understood in the light of the following description given with reference to the accompanying drawings, in which.

DETAILED DESCRIPTION OF THE INVENTION

Figure 1:
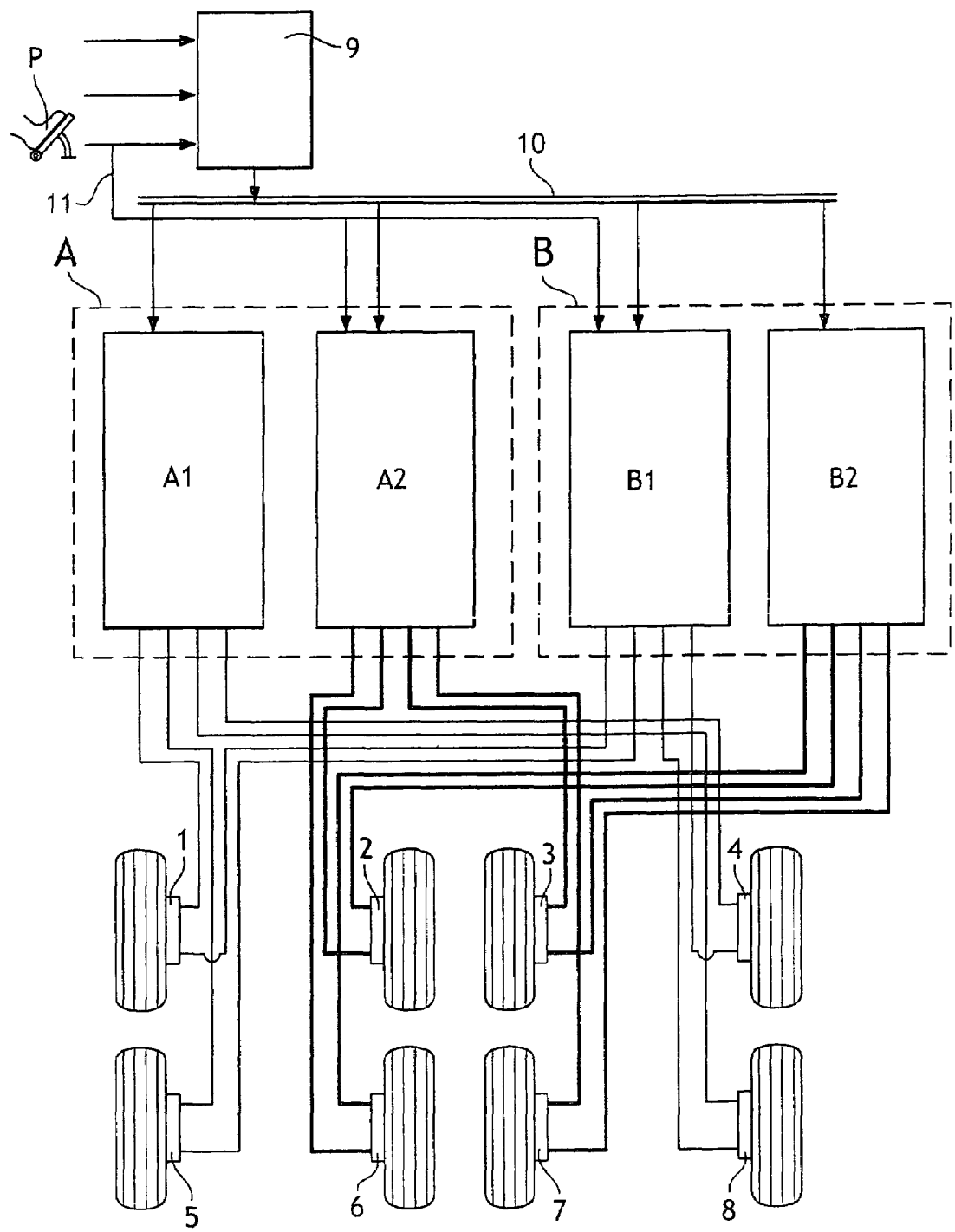
FIG. 1 is a diagram showing an airplane braking architecture of the invention.

With reference to FIG. 1, a braking system architecture for an airplane comprises two braking computers A, B, each comprising respective modules A1, A2 and B1, B2. In the application described herein, the airplane has two main undercarriages, each carrying four braked wheels having their brakes referenced respectively 1 to 8. The modules A1 and B1 both control wheel brakes 1 and 5 of the first undercarriage and wheel brakes 4 and 8 of the second undercarriage, while the modules AB and B2 both control wheel brakes 2 and 6 of the first undercarriage and wheel brakes 3 and 7 of the second undercarriage, as shown diagrammatically in the figure.

In fact, the modules A1, A2, B1, B2 do not control the brakes directly. If the brakes use hydraulic technology, then the modules deliver electrical signals to servo-valves (one valve per brake) which regulate the pressure in the brakes as a function of the electrical signals they receive. If the brakes are implemented control the current that is fed to the electric motors of the brakes as a function of the electrical signals they receive. In both cases, the electrical signals delivered by the modules can be identical, so the architecture shown can be used equally well for airplanes fitted with hydraulic brakes and for airplanes fitted with electric brakes.

It may be observed that the distribution of the brakes controlled by each module in a given braking computer is symmetrical, so a sudden failure of one of the modules will not lead to a swerve in the travel of an airplane running along a runway.

In normal operation mode, one of the braking computers A and B is active and thus controls all of the brakes. Which one of the braking computers is active can be selected in various ways that are known per se. For example, it is possible to use one of the braking computers on a permanent basis, with the other one being used only in the event of a failure in the computer that is used normally. It is also possible to decide to use the braking computers in alternation, changing the active braking computer for each flight.

The set of modules A1, A2, B1, B2 receives, over one or more communications buses 10, electrical information coming from the airplane cockpit and grouped via one or more concentrators 9. This electrical information includes in particular a signal coming from a braking selector enabling the pilot to indicate whether normal braking under pilot control is required, or automatic braking with programmed deceleration, or indeed that the airplane should be held stationary while parked. There are also electrical signals 11 coming from brake pedals P operated by the pilot.

Assume that the braking computer A is active. If the module A1 should fail, then the architecture is configured in conventional manner to hand over to braking computer B. This computer is capable of controlling all of the brakes, and thus ensures full-capacity braking. Braking thus continues to be provided in a normal braking mode.

If, in a first scenario, the module B1 should fail, then the module B2 continues to control half of the brakes (specifically the brakes 2, 3, 6, and 7). It is thus possible to continue to provide braking, even after two failures, and although the resulting braking is provided by only half of the brakes. This constitutes a degraded mode of braking.

If, in a second scenario, the module B2 should fail, then, in accordance with the invention, the architecture is configured to control all of the brakes by using the modules A2 and B1. With the module A2 controlling the brakes 2, 3, 6, and 7, and the module B2 controlling the brakes 1, 4, 5, and 8, it is possible to control all of the brakes using these two modules, even though physically said modules are located in two different computers. Thus, this new mode of braking is an alternative mode intermediate between degraded mode and normal mode, enabling all of the brakes to be controlled even though neither computer is fully active.

In order to add additional safety, the modules A2 and B1 receive the pedal signals 11 directly, thus making it possible, in the event of a failure of the communications bus 10, to continue braking the airplane as a function of indications from the pilot, given via the pedals.

If, following the second scenario, the module B1 should also fail, then it still remains possible using the module A2 to perform braking using half of the brakes. This is a return to the degraded mode of operation.

Alternatively, if the module A2 should fail, the module B1 would remain active, thus allowing braking to be performed using half of the brakes.

With the general principle of the invention described above, a preferred embodiment of the invention is described below with reference to FIGS. 2 to 5.

Figure 5:
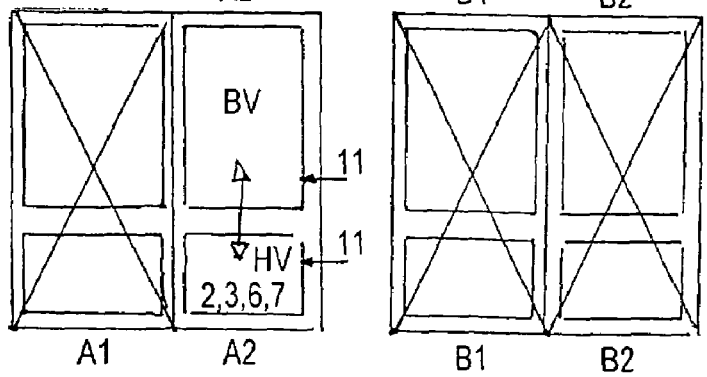

As can be seen in FIG. 5, and as explained, the architecture comprises two computers A and B each of which is subdivided into two modules respectively referenced A1, A2 and B1, B2. In this case, only the computer A is active in controlling all of the brakes.

In this case, each of the modules comprises a first electronics card, referred to herein as the low speed card BV suitable for generating a braking reference signal. For this purpose, the card BV has a plurality of inputs such as the pedal signal 11 of FIG. 1, or an auto-brake signal.

Each of the modules also has a second electronics card, referred to as the high speed card HV, adapted to generate control orders for the actuators (servo-valves for hydraulic brakes, electric motors for electric brakes) associated with the brakes controlled by said module. For this purpose, the HV card modulates the braking reference signal generated by the corresponding low speed card BV so as to avoid the wheels skidding during braking (with this applying, naturally, only to those braked wheels that are under the control of the module). For this purpose, the card HV has various inputs coming from various sensors (wheel rotation, pressure in circuits) associated with the braked wheels and with the brakes, enabling such modulation to be established.

The processor of the card HV is a processor adapted to operating at a higher speed than is the processor of the card BV, since the braking reference signal must be modulated in real time as a function of instantaneous information about the behavior of the wheels and the brakes. This difference in the speeds of the processors of the card BV and of the card HV explains why the cards are referred to as low speed and high speed.

The module A1 is powered by a first power supply bus PW1 associated with generators driven by the engines of the airplane. The module B2 is powered by a second power supply bus PW2 that is independent of the first power supply bus PW1, and that is associated with other generators driven by the engines of the airplane. The modules A2 and B1 are powered by a third power supply bus PWEss, independent of the power supply buses PW1 and PW2 and associated firstly with an auxiliary generator that is not driven by the engines of the airplane and secondly by a direct current (DC) source, such as batteries. It should be observed that a single breakdown in any one of the electricity sources of the power supply bus PWEss does not lead to a loss of the power supply bus PWEss.

Thus, a single breakdown affecting the power supply buses (loss of the bus PW1, loss of the bus PW2, or loss of one of the electricity sources of the bus PWEss) leads to the loss of only one of the four modules at the most.

Figure 2:
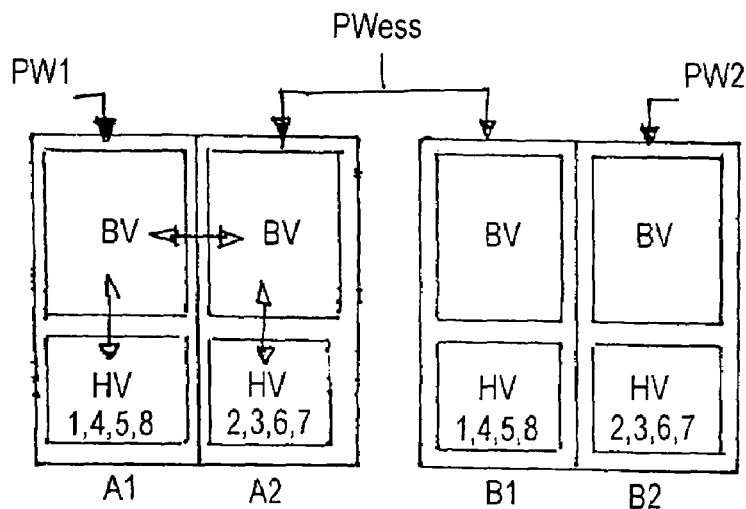
FIGS. 2 to 5 show different operating modes of a braking architecture constituting a particular embodiment of the invention.

For reasons of clarity, the power supplies shown in FIG. 2 are not reproduced in the following figures.

In order to improve braking safety, monitoring is organized between the cards or the modules in the same computer as follows:

the cards BV of modules A1 and A2 are adapted to monitor each other, e.g. by the processor on one of the cards BV running routines to verify proper operation of the other card BV, and vice versa, and also by making comparisons (in the software or using logic gates) on a regular basis between the braking reference signal generated by one of the cards BV and the braking reference signal generated by the other card BV. This monitoring is represented by an arrow between the cards BV of the modules A1 and A2; and in each module, the cards HV and BV monitor each other, so that the processor on one of the cards verifies that the processor on the other card is operating properly. This monitoring is symbolized by an arrow between the card BV and the card HV in each module.

Assume that the module A1 fails, either because the power supply bus PW1 has failed or because one of the cards in the module A1 detects a failure of the other card.

Figure 3:
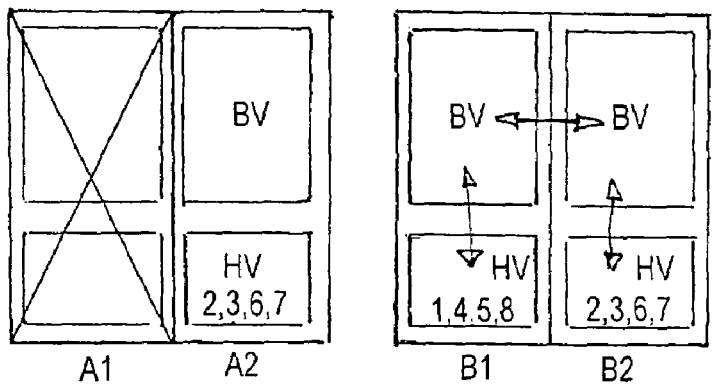

Then, as explained above, the computer A is deactivated and the second computer B takes over, as shown in FIG. 3, where the failed module A1 is crossed out.

The computer B is of the same structure as the computer A and operates in the same manner. The arrows represent the various monitoring operations performed firstly between the cards BV of the modules B1 and B2, and secondly between the card BV and the card HV in each of the modules B1 and B2.

Assume that the module B2 fails, either because the power supply bus PW2 has failed, or because a divergence has been detected between the cards BV and HV.

Figure 4:
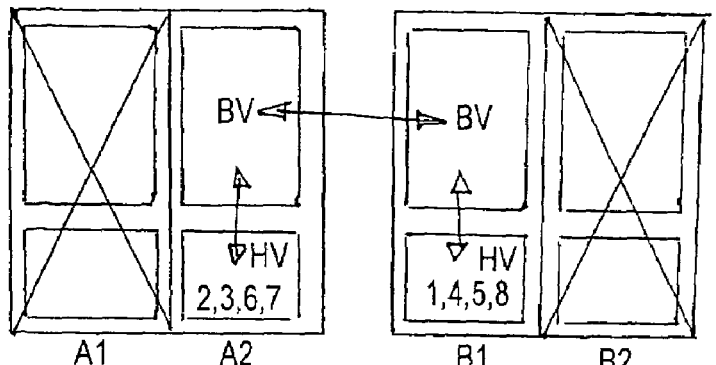

The architecture is then organized to operate by means of the module A2 in computer A and the module B1 in computer B, as shown in FIG. 4 where the failed module B2 is crossed out. In each of the modules A2 and B1, the cards HV and BV continue to monitor each other. In the invention, the cards BV of the modules A2 and B1 are also adapted to monitor each other, even though the modules do not form parts of the same computer.

Finally, in the event of the module B1 failing, then only the module A2 remains active and can serve to control only half of the brakes, as shown in FIG. 5, where the failed module B1 is crossed out.

In this respect, and in order to ensure a level of monitoring between the card BV and the card HV that exceeds mere checking for proper operation of the processors, at least one of the inputs of the card BV necessary for calculating the braking reference signal is duplicated at the card HV. For example, in this case the electrical signal 11 coming from the pedals P and forming one of the inputs to the card BV is shown symbolically as is an input of that signal to the card HV, thereby enabling the card HV itself to proceed with its own verification of the calculations performed by the card BV on the basis of said signal. This disposition enables braking safety to be increased in the degraded mode of operation when only one of the modules is active. Preferably, this duplication is performed on each of the modules.

The architecture of the invention thus makes it possible in the event of a single breakdown (switchover from normal mode operation of computer A to normal mode operation of computer B), or in the event of two breakdowns (switchover to alternative mode A2/B1), to continue providing braking using all of the brakes and while continuing to provide a high level of safety.

In comparison with a conventional type of architecture in which each computer has a first channel controlling of the braked wheels and a second channel monitoring the first channel, in order to obtain the same level of safety, it is necessary to use three computers, which is penalizing in terms of weight, of cost, maintenance, and complexity of operation.

In the event of three breakdowns (switching over to degraded mode A2 alone), the architecture of the invention still enables braking to be performed in degraded mode, using only one module and only half the wheels.

There remains an ultimate degraded mode which consists in braking the airplane by means of the parking brake.

In a particular aspect of the invention, the cards BV of the modules are configured to perform functions other than braking proper, such as lowering the undercarriages, or steering the airplane on the ground. These functions are generally considered as being less critical than the braking function. It can then be acceptable to omit organizing monitoring between the modules A2 and B1 (during operation of the kind shown in FIG. 4) in respect of these functions. Once such monitoring is not performed, these functions are preferably performed by other means, so as to guarantee sufficient operating safety. For example, lowering the undercarriages may be guaranteed merely by gravity, whereas steering the airplane on the ground may be provided by differential braking.

The invention is not limited to the particular embodiment described above, but on the contrary covers any variant coming within the ambit of the invention as defined by the claims.

In particular, although the embodiment described herein favors common operation of modules A2 and B1, it is possible in symmetrical manner to provide for common operation of the modules A1 and B2. Similarly, it is possible to provide degraded mode operation with the modules A2 or B1.

Finally, although the braking architecture of the invention is shown as being applied to an airplane having two main undercarriages each having four braked wheels, the same architecture can naturally be applied to other configurations, for example an airplane having two main wing undercarriages and one or two main fuselage undercarriages. It is then possible to devise various schemes for controlling the brakes by means of the modules. For example, it is possible to envisage that the modules A1 and B1 control the brakes of the wing undercarriages while the modules A2 and B2 control the brakes of the fuselage undercarriages.

What is claimed is:

1. An architecture for a braking system for an airplane fitted with a plurality of undercarriages each carrying a plurality of wheels, at least some of which are fitted with brakes, the architecture comprising at least two braking computers each having two modules such that in each computer, one of the modules controls a first fraction of the brakes and the other module controls a second fraction of the brakes complementary to the first, the architecture being configured to operate in any one of the following modes of operation:

a first normal mode in which both modules of one of the braking computers are active for controlling all of the brakes and both modules of the other of the braking computers do not actively control the brakes;

a second normal mode in which both modules of the other braking computer are active for controlling all of the brakes and both modules of the one of the braking computers do not actively control the brakes; and an alternative mode in which one module of one of the braking computers and one module of the other braking computer are active for controlling all of the brakes.

2. A braking system architecture according to claim 1, wherein the modules include first monitoring means configured so that in each mode of operation the two active modules monitor each other.

3. A braking system architecture according to claim 2, wherein each module comprises a first card adapted to generate a braking reference signal, and a second card adapted to generate a braking order for each brake associated with the module by modulating the braking reference signal in order to avoid skidding of said brake, the first monitoring means being associated with the first card of each module and being adapted to monitor the first card of the other active module.

4. A braking system architecture according to claim 3, wherein the first card and the second card in a given module include second monitoring means configured, when said module is active, to enable the first and second cards to monitor each other.

5. A braking system architecture according to claim 4, wherein the first card and the second card include at least one identical input.

6. A braking system architecture according to claim 1, the architecture being configured also to operate in a degraded mode in which only one of the modules of one of the braking computers is active.

7. A braking system architecture according to claim 1, wherein one of the modules of one of the computers is connected to a first power supply bus, one of the modules of the other computer is connected to a second power supply bus, and the other two modules that are intended to be active together in the alternative mode are connected to a third power supply bus.

8. A braking system architecture according to claim 1, wherein each module is configured to perform at least one function other than braking and involving at least one of the undercarriages of the airplane, such as steering the airplane or lowering and/or raising the undercarriages.

9. A method of managing a braking system architecture for an airplane fitted with a plurality of brakes, the architecture comprising at least two braking computers each comprising two modules such that in each computer, one of the modules controls a first fraction of the brakes, and the other module controls a second fraction of the brakes complementary to the first, the method including the step of causing two modules each belonging to a different one of the braking computers to operate simultaneously for controlling all of the plurality of brakes, and the step of causing both modules of one of the braking computers to actively control the brakes while both modules of the other of the braking computers do not actively control the brakes.

10. A method according to claim 9, wherein the two modules operating simultaneously monitor each other while they are operating simultaneously.

* * * * *